United States Patent
Park et al.

(10) Patent No.: US 11,481,274 B2
(45) Date of Patent: Oct. 25, 2022

(54) RAID DATA STORAGE DEVICE AND DATA STORAGE SYSTEM INCLUDING THE SAME

(71) Applicants: SK hynix Inc., Icheon (KR); UNIST(ULSAN NATIONAL INSTITUTE OF SCIENCE AND TECHNOLOGY), Ulsan (KR)

(72) Inventors: Hyunseung Park, Ulsan (KR); Eunjae Lee, Jeungpyeong-gun (KR); Sam Hyuk Noh, Seoul (KR)

(73) Assignees: SK hynix Inc., Icheon (KR); UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 0 days.

(21) Appl. No.: 17/191,216

(22) Filed: Mar. 3, 2021

(65) Prior Publication Data
US 2022/0058086 A1    Feb. 24, 2022

(30) Foreign Application Priority Data
Aug. 21, 2020 (KR) .......... 10-2020-0105239

(51) Int. Cl.
*G06F 11/10*        (2006.01)
*G06F 11/07*        (2006.01)
(Continued)

(52) U.S. Cl.
CPC ........ *G06F 11/1076* (2013.01); *G06F 3/0619* (2013.01); *G06F 3/0659* (2013.01);
(Continued)

(58) Field of Classification Search
CPC ............. G06F 11/0772; G06F 11/1489; G06F 11/1076; G06F 3/0619; G06F 3/0659; G06F 3/0689
See application file for complete search history.

(56) References Cited

U.S. PATENT DOCUMENTS 5,487,160 A * 1/1996 Bemis ................. G06F 11/1466
                                                              711/114
8,924,832 B1 * 12/2014 Lam .................... G06F 11/0703
                                                              711/202
(Continued)

FOREIGN PATENT DOCUMENTS

| KR | 20130111821 A | 10/2013 |
| KR | 102072829     | 2/2020  |
| KR | 20200031402 A | 3/2020  |

OTHER PUBLICATIONS

"NVM Express Revision 1.3", May 1, 2017, pp. 1-282, http://nvmexpress.org.

(Continued)

*Primary Examiner* — Matthew M Kim
*Assistant Examiner* — Matthew N Putaraksa

(57) ABSTRACT

A data storage system includes a host configured to provide a read request; a plurality of storage devices constituting a redundant array of independent disks (RAID); and a RAID controller configured to a plurality of read commands in response to the read request, the read commands being provided to the plurality of storage devices according to a RAID setting, wherein one data storage device of the plurality of data storage devices includes a nonvolatile memory device; an error handling information storage circuit to store error handling information; and an error detection and correction circuit configured to detect an error in data output from the nonvolatile memory device according to a read command and to selectively correct the error according to the error handling information.

12 Claims, 7 Drawing Sheets

(51) Int. Cl.
*G06F 3/06* (2006.01)
*G06F 11/14* (2006.01)

(52) U.S. Cl.
CPC ........ *G06F 3/0689* (2013.01); *G06F 11/0772* (2013.01); *G06F 11/1489* (2013.01)

(56) References Cited

U.S. PATENT DOCUMENTS

| | | | | |
|---|---|---|---|---|
| 10,339,005 B2* | 7/2019 | McGlaughlin | | G06F 3/0679 |
| 2006/0279869 A1* | 12/2006 | Yamamoto | | G06F 1/206 |
| | | | | 360/69 |
| 2007/0250679 A1* | 10/2007 | Umemura | | G06F 3/0616 |
| | | | | 711/170 |
| 2009/0077416 A1* | 3/2009 | D'Souza | | G06F 11/1076 |
| | | | | 714/6.12 |
| 2009/0100302 A1* | 4/2009 | Francis | | G06F 11/1076 |
| | | | | 360/97.12 |
| 2009/0172273 A1* | 7/2009 | Piszczek | | G06F 11/1092 |
| | | | | 711/114 |
| 2012/0047327 A1* | 2/2012 | Ueda | | G06F 3/065 |
| | | | | 711/114 |
| 2012/0072680 A1* | 3/2012 | Kimura | | G06F 11/108 |
| | | | | 711/154 |
| 2014/0075116 A1* | 3/2014 | Takahashi | | G06F 3/0619 |
| | | | | 711/114 |
| 2015/0067443 A1* | 3/2015 | Bao | | G06F 11/1048 |
| | | | | 714/764 |
| 2015/0331749 A1* | 11/2015 | O'Connor | | G06F 3/0619 |
| | | | | 714/764 |
| 2016/0357635 A1* | 12/2016 | Dhuse | | G06F 3/067 |
| 2017/0123995 A1* | 5/2017 | Freyensee | | G06F 11/2094 |
| 2017/0255515 A1* | 9/2017 | Kim | | G06F 3/065 |
| 2018/0018233 A1* | 1/2018 | Kim | | G06F 11/1096 |
| 2018/0039541 A1* | 2/2018 | Hahn | | G06F 3/0619 |
| 2018/0219562 A1* | 8/2018 | Lee | | G06F 11/1012 |
| 2018/0225176 A1* | 8/2018 | Kim | | G06F 13/1668 |
| 2019/0138230 A1* | 5/2019 | Lim | | G06F 3/0619 |
| 2019/0163571 A1* | 5/2019 | Cheng | | G06F 3/0689 |
| 2019/0213078 A1* | 7/2019 | Date | | G06F 11/1012 |
| 2019/0361606 A1* | 11/2019 | Goker | | H03M 13/2918 |
| 2020/0125447 A1* | 4/2020 | Hosmani | | G06F 3/0652 |
| 2020/0174689 A1* | 6/2020 | Hutchison | | G06F 3/0689 |
| 2021/0049063 A1* | 2/2021 | Reed | | G06F 11/0793 |
| 2021/0286350 A1* | 9/2021 | Wang | | H04L 67/02 |

OTHER PUBLICATIONS

"NVM Express Base Specification NVM Express Revision 1.4", Jun. 10, 2019, pp. 1-403, http://nvmexpress.org.

* cited by examiner

RAID DATA STORAGE DEVICE AND DATA STORAGE SYSTEM INCLUDING THE SAME

CROSS-REFERENCE TO RELATED APPLICATION

The present application claims priority under 35 U.S.C. § 119(a) to Korean Patent Application No. 10-2020-0105239, filed on Aug. 21, 2020, which is incorporated herein by reference in its entirety.

BACKGROUND

1. Technical Field

Various embodiments generally relate to a data storage device and a data storage system, and more specifically to a Redundant Array of Independent Disks (RAID) data storage device and a data storage system including the same.

2. Related Art

A data storage device such as a solid state drive (SSD) has a problem in that an error rate increases as a usage time is increased.

Conventionally, when an error occurs inside an SSD, the error is corrected using an error correction code (ECC) such as a Hamming code, a Reed-Solomon code, or low density parity check (LDPC), or a super page-level parity.

However, the better the correction performance, the longer a correction time is, and the longer the usage time of the data storage device, the more frequent an error occurs. As a result, the performance of the data storage device may deteriorate due to the error correction.

SUMMARY

In accordance with an embodiment of the present disclosure, a data storage system may include a host configured to provide a read request; a plurality of storage devices constituting a redundant array of independent disks (RAID); and a RAID controller configured to a plurality of read commands in response to the read request, the read commands being provided to the plurality of storage devices according to a RAID setting, wherein one data storage device of the plurality of data storage devices includes a nonvolatile memory device; an error handling information storage circuit to store error handling information; and an error detection and correction circuit configured to detect an error in data output from the nonvolatile memory device according to a read command and to selectively correct the error according to the error handling information.

In accordance with an embodiment of the present disclosure, a data storage device may include a nonvolatile memory device; a device control circuit configured to control the nonvolatile memory device according to a read command; an error handling information storage circuit to store error handling information; and an error detection and correction circuit configured to detect an error in data output from the nonvolatile memory device according to the read command and to selectively correct the error according to the error handling information.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate various embodiments, and explain various principles and advantages of those embodiments.

DETAILED DESCRIPTION

The following detailed description references the accompanying figures in describing illustrative embodiments consistent with this disclosure. The embodiments are provided for illustrative purposes and are not exhaustive. Additional embodiments not explicitly illustrated or described are possible. Further, modifications can be made to presented embodiments within the scope of the present teachings. The detailed description is not meant to limit this disclosure. Rather, the scope of the present disclosure is defined in accordance with claims and equivalents thereof. Also, throughout the specification, reference to "an embodiment" or the like is not necessarily to only one embodiment, and different references to any such phrase are not necessarily to the same embodiment(s).

Figure 1:
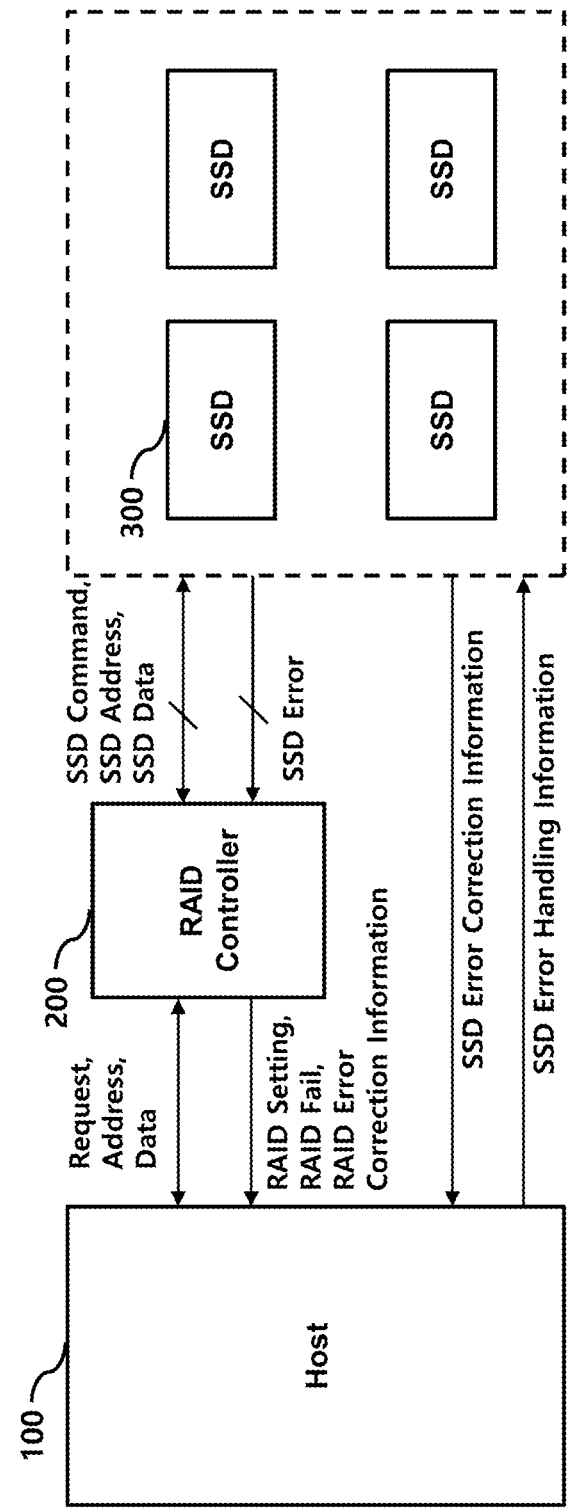
FIG. 1 illustrates a data storage system according to an embodiment of the present disclosure.

FIG. 1 illustrates a data storage system 1 according to an embodiment of the present disclosure.

The data storage system 1 includes a host 100, a Redundant Array of Independent Disks (RAID) controller 200, and a plurality of data storage devices 300 constituting a RAID. In the RAID, memory spaces in the plurality of data storage devices 300, which are indicated by the same address, are grouped as a 'Stripe' and store copies of the same data and/or copies of parity information for the same data.

The plurality of data storage devices 300 constituting the RAID may be referred to as a plurality of RAID data storage devices 300.

In this embodiment, the data storage device 300 is a solid state drive (SSD), but is not limited thereto. Hereinafter, the data storage device 300 may be referred to as an SSD.

The RAID controller 200 may manage the plurality of data storage devices 300 as the RAID.

A technology for managing multiple data storage devices as a RAID according to various settings such as RAID 0, 1, 4, 5, 6, 1+0, and 0+1 is well known, so a detailed description thereof will be omitted.

The RAID controller 200 manages the plurality of data storage devices 300 according to the above RAID settings.

The RAID controller 200 may be implemented in hardware, software, or a combination of hardware and software.

The RAID controller 200 may be implemented as a part of the host 100, but in FIG. 1, the host 100 and the RAID controller 200 are illustrated using separate blocks.

The host 100 provides a read or write request and an address to the RAID controller 200, and the RAID controller 200 provides a command and an address to the plurality of data storage devices 300 according to the read or write request transmitted from the host 100.

In this case, a command and an address provided to the data storage device 300 may be referred to as an SSD command and an SSD address.

When a write request is provided by the host 100, data provided by the host 100 may be provided to the plurality of data storage devices 300 through the RAID controller 200.

When a read request is provided by the host 100, data output from the plurality of data storage devices 300 is provided to the host 100 through the RAID controller 200.

Since the present embodiment relates to data recovery corresponding to a read request, a request and a command hereinafter will be understood as a read request and a read command unless otherwise indicated.

When an error occurs in data after a read operation is performed, the data storage device 300 may directly recover the data having the error according to error handling information and send recovered data to the RAID controller 200 or send the data without correcting the error to the RAID controller 200. In this case, the error handling information may be referred to as SSD error handling information.

The data storage device 300 stores error correction information when directly recovering the data by correcting the error. The error correction information of the data storage device 300 may be referred to as SSD error correction information or storage error correction information.

The SSD error correction information may include a time taken for error correction, an error occurrence frequency, and the number of error bits. For example, the time taken for error correction may be information obtained by averaging a certain number of recent error correction times.

The SSD error handling information may indicate whether the data storage device 300 should correct errors or not.

The SSD error handling information may indicate levels of recovery to apply when correcting an error.

According to the version 1.4 of the NVMe standard, which is a communication standard for nonvolatile storage devices connected by PCI Express interface, a read recovery level (RRL) is proposed. The RRL can be seen as an example of the SSD error handling information.

The RRL may include a level 0 (RRL 0) to a level 15 (RRL 15).

The data storage device 300 may adjust data recovery performance according to the SSD error handling information. For example, the data storage device 300 may increase the error correction performance as the RRL decreases closer to the level 0 (RRL 0), and may decrease the error correction performance as the RRL increases closer to the level 15 (RRL 15).

Accordingly, as the RRL decreases, a response time of the data storage device 300 becomes longer, i.e., the data storage device 300 responds fast, whereas, as the RRL increases, the response time becomes shorter, i.e., the data storage device 300 responds slowly.

For example, when the RRL is set to the level 15, the data storage device 300 may notify the RAID controller 200 of the occurrence of an error through an SSD error signal without correcting the error, and this may be referred to as 'fast-fail.'

When the RAID controller 200 receives the SSD error signal, the error may be corrected by reading a copy of data, a part of the data, or parity information stored in the other data storage devices managed by the RAID controller 200.

After correcting the error, the RAID controller 200 may provide a command for writing recovered data to the data storage device 300 in which the error has occurred.

The RAID controller 200 stores error correction information when correcting the error. The error correction information of the RAID controller 200 may be referred to as RAID error correction information.

The RAID error correction information may include a time required for error correction, an error occurrence frequency, and the number of error bits. For example, the time taken for error correction may be information obtained by averaging a certain number of recent error correction times.

The host 100 may adjust the SSD error handling information for the plurality of data storage devices 300 by referring to the RAID error correction information and the SSD error correction information.

Figure 2:
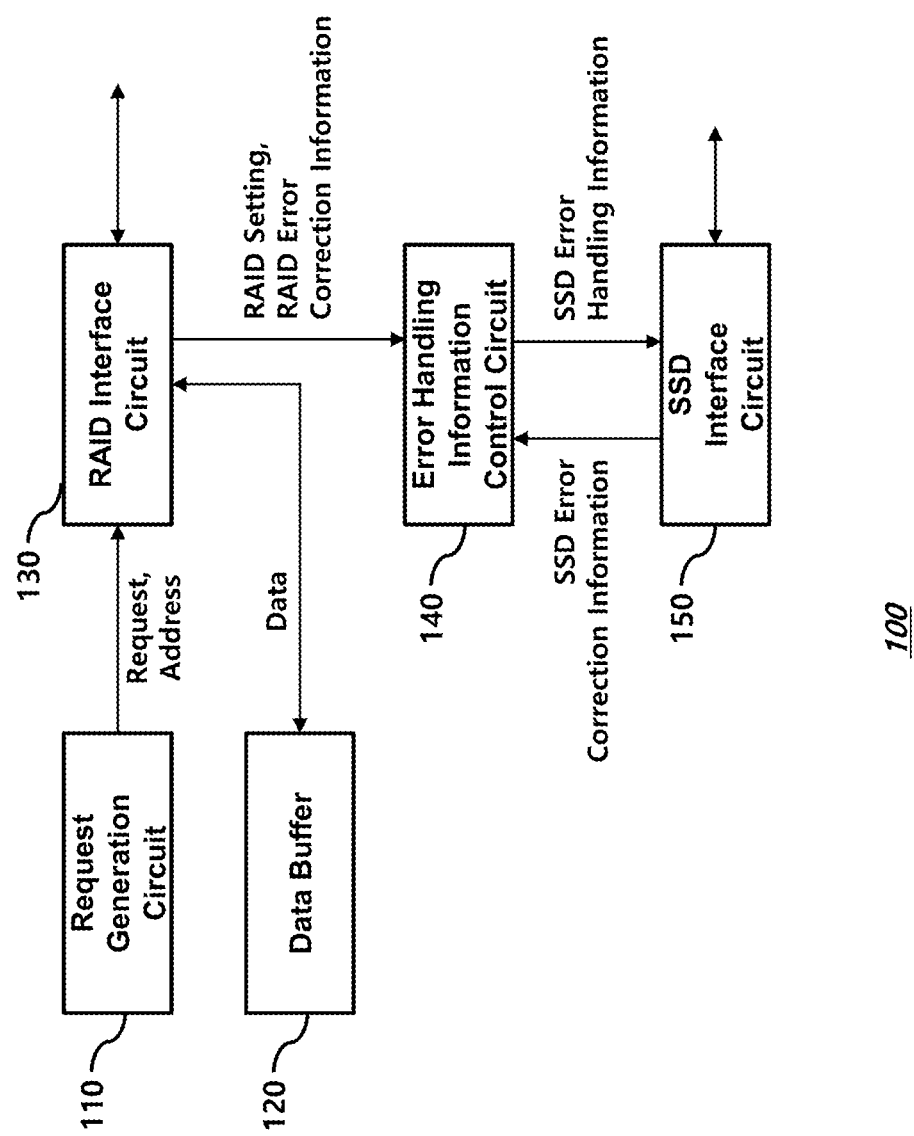
FIG. 2 illustrates a host according to an embodiment of the present disclosure.

FIG. 2 illustrates the host 100 of FIG. 1 according to an embodiment of the present disclosure.

Referring to FIG. 2, the host 100 includes a request generation circuit 110, a data buffer 120, a RAID interface circuit 130, an error handling information control circuit 140, and an SSD interface circuit 150.

The request generation circuit 110 may generate a read request, a write request, or the like, and an address, and these are provided to the RAID controller 200 shown in FIG. 1 through the RAID interface circuit 130.

The data buffer 120 stores write data or read data. The read data is provided from the RAID controller 200.

The error handling information control circuit 140 adjusts the SSD error handling information according to the RAID error correction information and the SSD error correction information.

The RAID error correction information may be provided by the RAID controller 200 through the RAID interface circuit 130.

The SSD error correction information may be provided by the data storage devices 300 shown in FIG. 1 through the SSD interface circuit 150, and the SSD error handling information may be provided to the data storage devices 300 through the SSD interface circuit 150.

The error handling information control circuit 140 may adjust the SSD error handling information by additionally referring to the RAID setting.

For example, in the case of RAID 0, since the error cannot be corrected at the level of the RAID controller 200, the SSD error handling information may be adjusted so that the data storage device 300 directly corrects the error by referring to the RAID setting.

Figure 5:
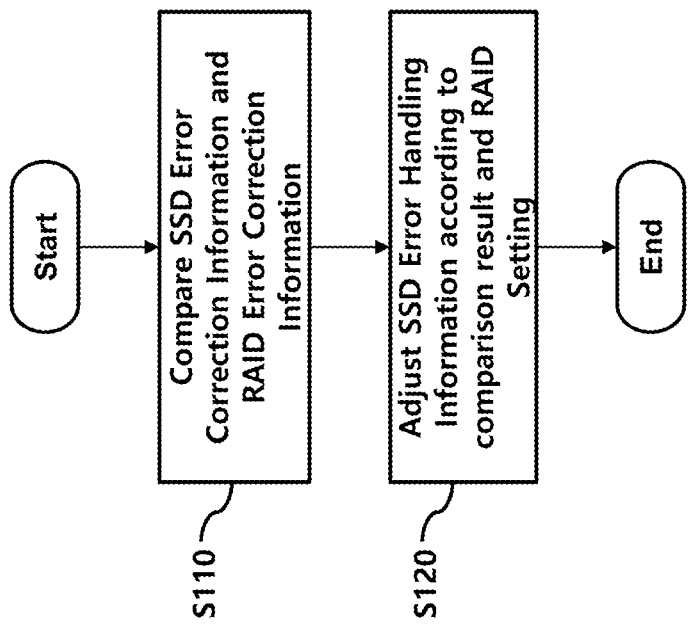
FIG. 5 is a flowchart showing an operation of a host according to an embodiment of the present disclosure.

FIG. 5 is a flowchart showing an operation of the host 100 of FIG. 2, in particular, an operation of the error handling information control circuit 140.

An error handling information adjustment operation may be performed for each of the plurality of data storage devices 300 shown in FIG. 1.

At S110, the error handling information control circuit 140 compares the SSD error correction information transmitted from any one of the plurality of data storage devices 300 with the RAID error correction information transmitted from the RAID controller 200.

At S120, the error handling information control circuit 140 adjusts SSD error handling information for the data storage device 300 according to the comparison result.

For example, if a time taken to correct an error in the data storage device 300 is longer than a time taken to correct an error in the RAID controller 200, the SSD error handling information of the data storage device 300 may be set to RRL 15. The SSD error correction information includes the time taken to correct an error in the data storage device 300, and the RAID error correction information includes the time taken to correct an error in the RAID controller 200.

By setting the SSD error handling information to RRL 15, when an error occurs therein, the data storage device 300 does not correct the error by itself, but allows the RAID controller 200 to correct the error, thereby improving a response time of the data storage device 300.

However, when the RAID setting is set to RAID 0 and thus the error cannot be corrected at the RAID controller 200, it is not desirable to set the SSD error handling information to RRL 15. Therefore, the error handling information control circuit 140 additionally refers to the RAID setting when adjusting the SSD error handling information.

RAID setting information may be stored in the host 100, but may be provided from the RAID controller 200.

The host 100 may perform the SSD error handling information adjustment operation described in FIG. 5 in an idle state to prevent system performance degradation, but embodiments are not limited thereto.

Figure 3:
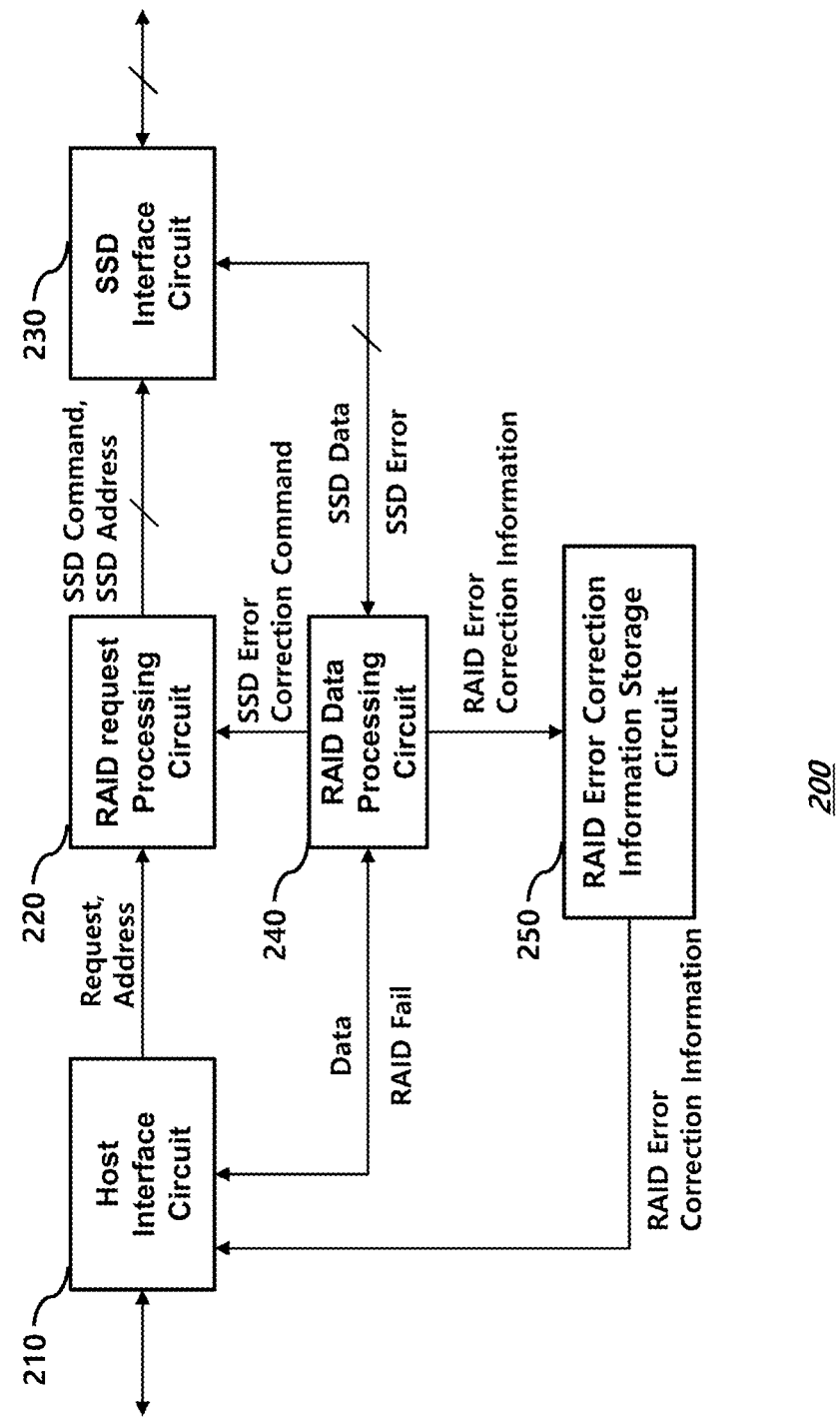
FIG. 3 illustrates a RAID controller according to an embodiment of the present disclosure.

FIG. 3 is a block diagram showing the RAID controller 200 of FIG. 1 according to an embodiment of the present disclosure.

Referring to FIG. 3, the RAID controller 200 includes a host interface circuit 210, a RAID request processing circuit 220, an SSD interface circuit 230, a RAID data processing circuit 240, and a RAID error correction information storage circuit 250.

A read request and an address provided by the host 100 are input through the host interface circuit 210.

The RAID request processing circuit 220 generates commands and addresses to be provided to the plurality of data storage devices 300 in response to the read request and the address provided by the host 100.

In this case, a command and an address provided to each of the plurality of data storage devices 300 may be referred to as an SSD command and an SSD address. The SSD command and the SSD address provided to each of the plurality of data storage devices 300 are generated according to predetermined RAID setting information.

The SSD interface circuit 230 provides an SSD read command and an SSD address, which are generated by the RAID request processing circuit 220, to the data storage device 300. After that, the SSD interface circuit 230 receives SSD data from the data storage device 300 according to the SSD read command.

The RAID data processing circuit 240 generates read-requested data by using a plurality of SSD data received from the plurality of data storage devices 300.

In this case, the plurality of SSD data provided by the plurality of data storage devices 300 may include one or more of a copy of data requested by the host 100, a part of the data requested by the host 100, and parity information corresponding to the data, which may vary according to RAID settings of the RAID controller 200.

For example, in the case of RAID 0, the read-requested data can be provided to the host 100 by combining the plurality of SSD data.

For example, in the case of RAID 1, the plurality of SSD data are the same, so one of them can be provided to the host 100.

In this way, the RAID data processing circuit 240 generates the read-requested data by using one or more of the plurality of SSD data.

The RAID data processing circuit 240 may further receive an SSD error signal from the data storage device 300 through the SSD interface circuit 230.

The SSD error signal indicates that the data storage device 300 has not corrected an error. If the error is not corrected by the data storage device 300, unrecovered data may be transmitted to the RAID controller 200 together with the SSD error signal.

When receiving the SSD error signal, the RAID data processing circuit 240 may correct the error included in the SSD data using a RAID technology.

In the case of RAID 0, if an error occurs in data, it is impossible to recover the data using the RAID technology. Therefore, a RAID setting capable of recovering data using a copy of data, a part of data, or parity information stored in the other data storage devices 300 is assumed to apply the RAID technology.

When the RAID data processing circuit 240 corrects the error, the RAID error correction information is stored in the RAID error correction information storage circuit 250.

As described above, the RAID error correction information may include information such as a time taken for error correction.

The RAID error correction information may be provided to the host 100 through the host interface circuit 210.

Figure 6:
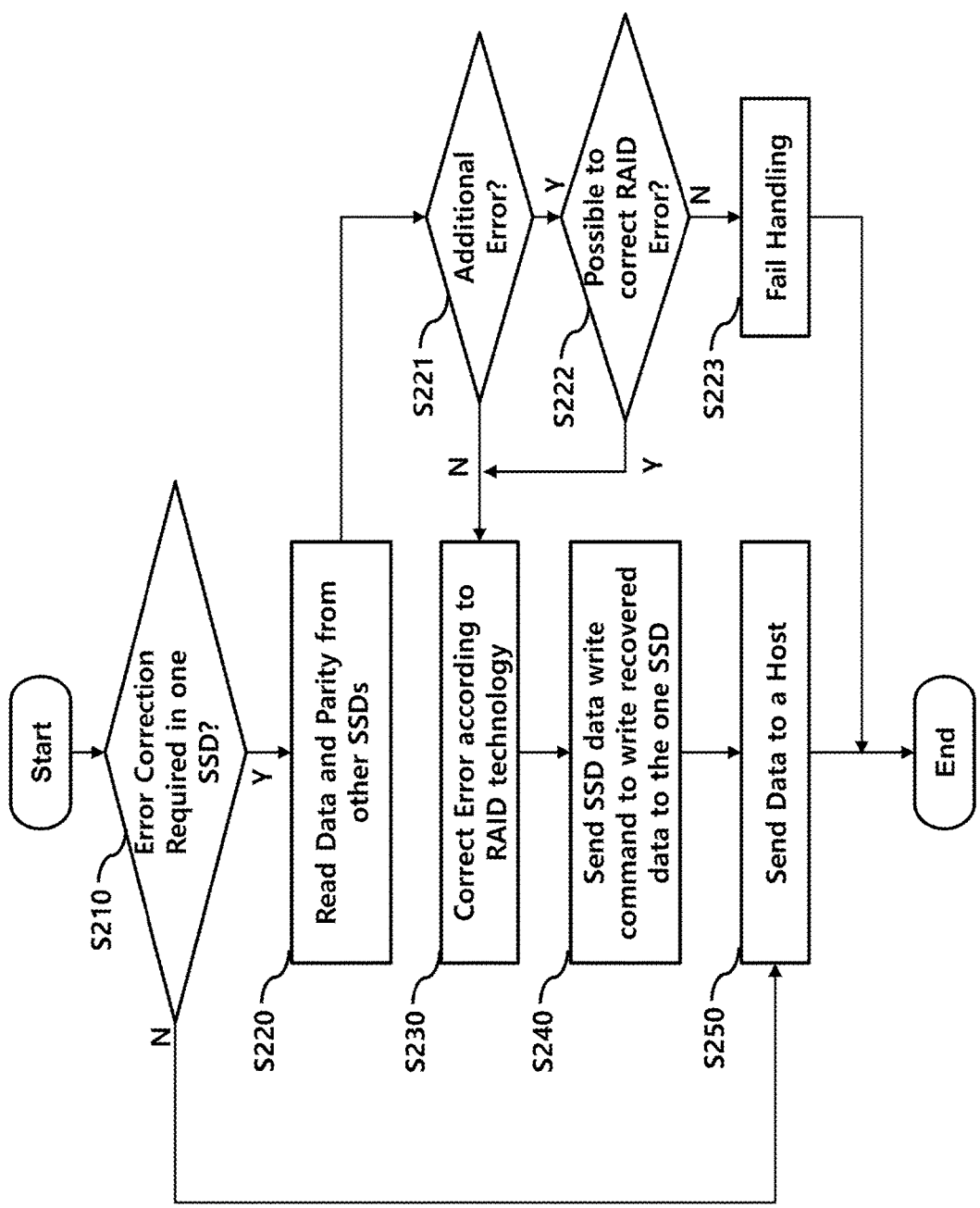
FIG. 6 is a flowchart showing an operation of a RAID controller according to an embodiment of the present disclosure.

FIG. 6 is a flowchart showing an operation of the RAID controller 200 of FIG. 3 according to an embodiment of the present disclosure. The operation shown in FIG. 6 will be described with reference to FIG. 3.

First, it is determined whether error correction is necessary by referring to an SSD error signal from one of the plurality of data storage devices 300 at S210.

If the error correction is not required, data is transferred to the host 100 at S250 and the operation is terminated.

On the other hand, if the error correction is required, one or more of a copy of the data, a part of the data, and parity information of the data are read from the other data storage devices 300 at S220.

At this time, it is determined whether an additional error has occurred in the other data storage devices 300 at S221.

If the additional error has occurred, it is determined whether the error correction is possible with the RAID technology at S222.

It is well known to determine whether an error can be corrected by the RAID technology and correct the error accordingly, so a description thereof will be omitted.

If the additional error has not occurred or if the error correction is possible even if the additional error has occurred, the error is corrected using the RAID technology at S230.

Thereafter, a command to write recovered data to one or more of the data storage devices 300 where the errors have occurred is provided at S240.

Thereafter, the data is transmitted to the host 100 at S250 and the operation is terminated.

If it is determined that the error correction is impossible with the RAID technology at S222, fail handling is performed at S223.

For the fail handling, the RAID controller 200 may provide an RAID fail signal to the host 100.

In this case, the RAID fail signal may include information on the data storage device 300 in which the error has occurred.

When receiving the RAID fail signal, the host 100 ignores the steps shown in FIG. 5 and adjusts the SSD error handling information of the corresponding data storage device 300 so that the corresponding data storage device 300 performs the error correction by itself.

Thereafter, the host 100 may provide the read request that caused the RAID failure to the RAID controller 200 again.

The fail handling can be performed in other ways.

For example, the RAID controller 200 may directly instruct to correct the SSD error handling information of the data storage device 300 that caused the RAID fail signal.

In this case, FIGS. 3 and 4 may be changed as follows.

Figure 4:
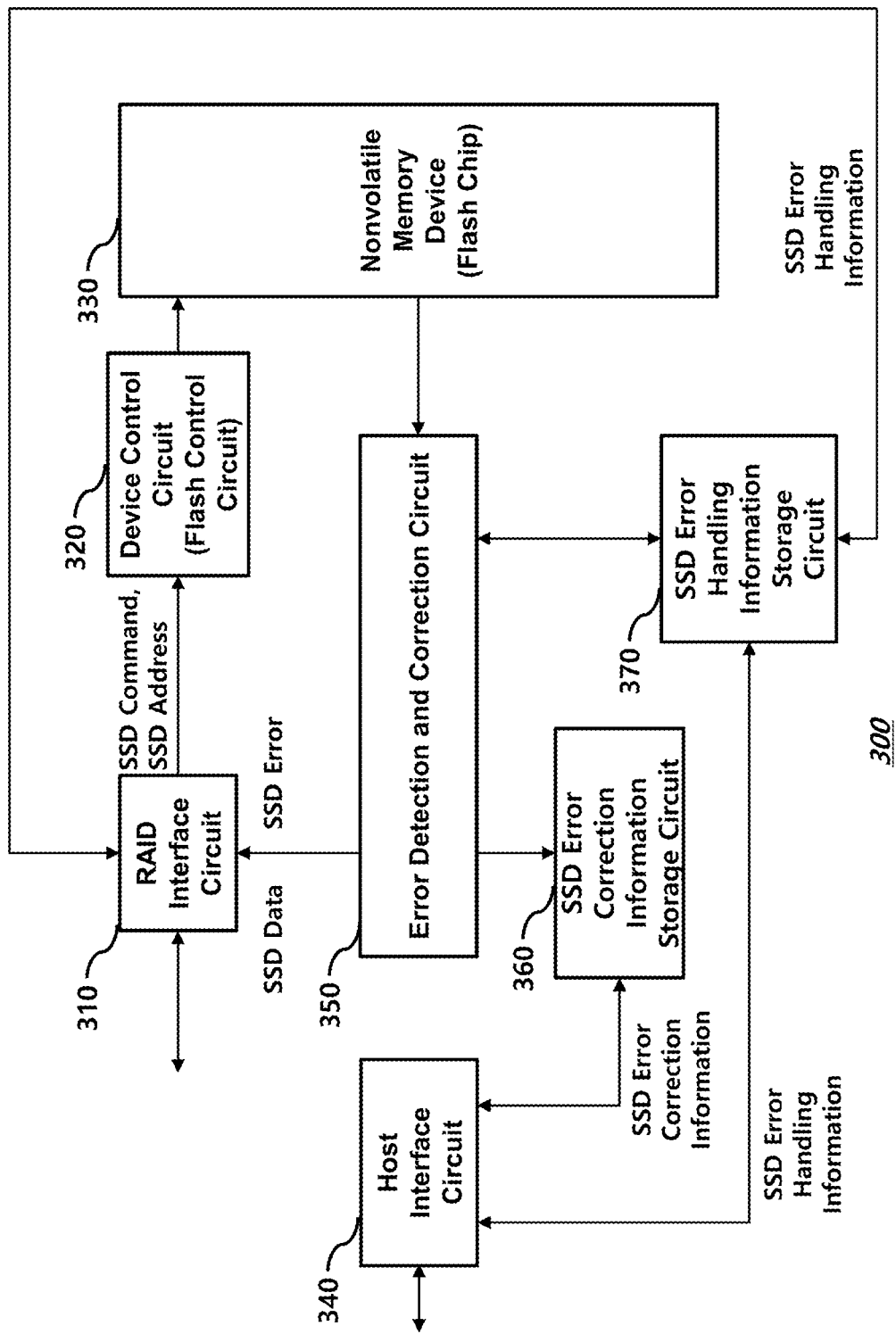
FIG. 4 illustrates a data storage device according to an embodiment of the present disclosure.

That is, in FIG. 3, the RAID data processing circuit 220 may additionally transmit SSD error handling information to the data storage device 300 through the SSD interface circuit 230, and an SSD error handling information storage circuit 370 in FIG. 4 may receive the SSD handling information additionally provided through a RAID interface circuit 310.

FIG. 4 illustrates the data storage device 300 of FIG. 1 according to an embodiment of the present disclosure.

Referring to FIG. 4, the data storage device 300 includes the RAID interface circuit 310, a device control circuit 320, a nonvolatile memory device 330, a host interface circuit 340, an error detection and correction circuit 350, and an SSD error correction information storage circuit 360, and the SSD error handling information storage circuit 370.

A flash chip is an example of the nonvolatile memory device 330, and hereinafter, the nonvolatile memory device 330 may be referred to as the flash chip 330. In this case, the device control circuit 320 may be referred to as a flash control circuit 320.

The flash control circuit 320 controls a read operation for the flash chip 330 according to an SSD command and an SSD address transmitted through the RAID interface circuit 310.

Since read or write operations of the flash control circuit 320 and the flash chip 330 are well known, detailed descriptions therefor will be omitted.

The error detection and correction circuit 350 detects and corrects an error in data output from the flash chip 330.

Since an error detection and correction operation can be implemented by using various technologies such as ECC, detailed descriptions therefor are omitted.

When the error is detected in the data output from the flash chip 330, the error detection and correction circuit 350 refers to the SSD error handling information stored in the SSD error handling information storage circuit 370.

For example, as described above, when the SSD error handling information corresponds to RRL 15, the error detection and correction circuit 350 transmits an SSD error signal to the RAID controller 200 through the RAID interface circuit 310 without correcting the error.

In other cases, the error detection and correction circuit 350 performs an error correction operation with reference to the SSD error handling information, and provides the SSD error correction information storage circuit 360 with a time taken for the error correction to update the SSD error correction information.

In addition, when performing the error correction operation, the error correction technology can be variously changed and applied so that the error correction performance is adjusted according to the SSD error handling information.

As described above, the SSD error correction information may be provided to the host 100 through the host interface circuit 340.

In addition, the SSD error handling information adjusted by the host 100 may be provided to the SSD error handling information storage circuit 370 through the host interface circuit 340.

As described above, when the RAID controller 200 directly performs the RAID fail processing, the SSD error handling information provided from the RAID controller 200 is additionally provided to the SSD error handling information storage circuit 370 through the RAID interface circuit 310.

Figure 7:
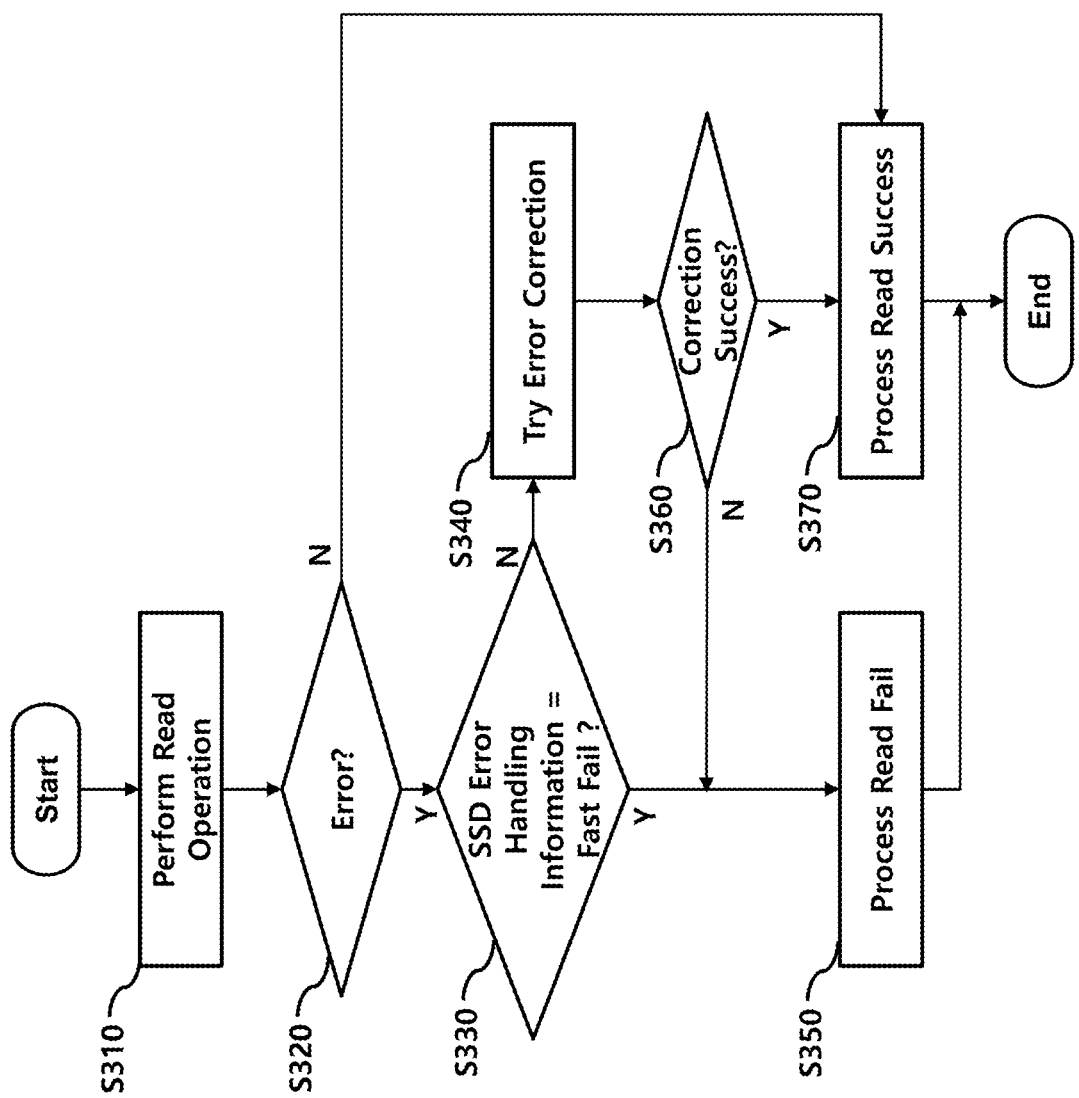
FIG. 7 is a flowchart showing an operation of a data storage device according to an embodiment of the present disclosure.

FIG. 7 is a flowchart illustrating a read operation of the data storage device 300 of FIG. 1 according to an embodiment of the present disclosure. The read operation shown in FIG. 7 will be described with reference to FIG. 4.

First, the read operation is performed on the flash chip 330 at S310.

Thereafter, it is determined whether an error exists in data read from the flash chip 330 at S320.

If no error has occurred, a read success processing operation is performed at S370, and the process is terminated.

The read success processing operation is to output the data output from the flash chip 330 as SSD data to the RAID controller 200.

If it is determined at S320 that the error occurs in the data read from the flash chip 330, it is determined whether the SSD error handling information corresponds to the fast-fail, such as RRL 15, at S330.

In the case of the fast-fail, a read failure processing operation is performed at S350, and the process is terminated.

The read failure processing operation is to output an SSD error signal to the RAID controller 200.

At S330, if the SSD error handling information does not correspond to the fast-fail, error correction is attempted at S340.

When performing the error correction, the technology used for the error correction can be changed by referring to the SSD error handling information.

Thereafter, it is determined whether the error correction is successful at S360.

If the error correction is successful, the read success processing operation is performed at S370, and if the error correction fails, the read failure processing operation is performed at S350, and then the process is terminated.

In the above description, it has been disclosed that the SSD error handling information is controlled by the host 100 or the RAID controller 200.

According to an embodiment, the error detection and correction circuit 350 of the data storage device 300 may directly update the SSD error handling information by referring to the SSD error correction information.

For example, if an SSD error correction time is longer than a predetermined time, the error detection and correction circuit 350 may directly update the SSD error handling information.

For example, the predetermined time may be experimentally determined as a value approximating the RAID error correction time. In this case, if the SSD error correction time is longer than the predetermined time, the SSD error handling information may be updated so that the data storage device 300 does not correct the error directly.

Although various embodiments have been illustrated and described, various changes and modifications may be made to the described embodiments without departing from the spirit and scope of the invention as defined by the following claims.

What is claimed is:

1. A data storage system, comprising:
   a host configured to provide a read request;
   a plurality of data storage devices constituting a redundant array of independent disks (RAID); and a RAID controller configured to generate a plurality of read commands in response to the read request, the read commands being provided to the plurality of data storage devices according to a RAID setting,
wherein one data storage device of the plurality of data storage devices includes:
a nonvolatile memory device;
an error handling information storage circuit to store error handling information; and
an error detection and correction circuit configured to detect an error in data output from the nonvolatile memory device according to a read command and to selectively correct the error according to the error handling information,
wherein the RAID controller includes a RAID data processing circuit configured to correct the error of the one data storage device by using data read from other data storage devices among the plurality of data storage devices when the error detection and correction circuit does not correct the error, and
wherein the host includes an error handling information control circuit to adjust the error handling information based on a result of comparing storage error correction information of the one data storage device with RAID error correction information of the RAID controller.

2. The data storage system of claim 1, wherein the RAID controller provides a write command for writing recovered data to the one data storage device when the RAID data processing circuit generates the recovered data by correcting the error.

3. The data storage system of claim 1, wherein the one data storage device further includes an error correction information storage circuit to store the storage error correction information and updates the storage error correction information when the error detection and correction circuit corrects the error.

4. The data storage system of claim 1, wherein the RAID controller further includes a RAID error correction information storage circuit and updates the RAID error correction information when the RAID data processing circuit corrects the error.

5. The data storage system of claim 1, wherein the host adjusts the error handling information so that the one data storage device does not correct the error when an error correction time of the one data storage device is longer than an error correction time of the RAID controller.

6. A data storage device, comprising:
a nonvolatile memory device;
a device control circuit configured to control the nonvolatile memory device according to a read command;
an error handling information storage circuit to store error handling information; and
an error detection and correction circuit configured to detect an error in data output from the nonvolatile memory device according to the read command and to selectively correct the error according to the error handling information,
an error correction information storage circuit to store storage error correction information; and
a host interface circuit configured to send the storage error correction information to a host and to receive updated error handling information from the host,
wherein the error detection and correction circuit updates the storage error correction information when the error detection and correction circuit corrects the error, and
wherein the error handling information storage circuit updates the error handling information with the updated error handling information.

7. The data storage device of claim 6, wherein the host generates the updated error handling information according to the storage error correction information.

8. The data storage device of claim 6, wherein the error detection and correction circuit adjusts the error handling information based on a result of comparing the storage error correction information with a predetermined condition.

9. The data storage device of claim 8, wherein the error detection and correction circuit adjusts the error handling information so that the error detection and correction circuit does not correct the error, when an error correction time included in the storage error correction information is longer than a predetermined time.

10. The data storage device of claim 6, wherein the data storage device is controlled by a RAID controller, and the data storage device further includes a RAID interface circuit, which receives the read command from the RAID controller, transmits the read command to the device control circuit, and transmits the data output from the nonvolatile memory device to the RAID controller.

11. The data storage device of claim 10, wherein the error detection and correction circuit provides an error signal to the RAID controller when the error detection and correction circuit does not correct the error.

12. The data storage device of claim 11, wherein the device control circuit controls the nonvolatile memory device to write recovered data provided from the RAID controller, and
wherein the RAID controller corrects the error in response to the error signal to generate the recovered data.

* * * * *